United States Patent [19]

Gregory et al.

[11] 4,206,857
[45] Jun. 10, 1980

[54] AGRICULTURAL DISTRIBUTOR HAVING A CONTROL VALVE FOR PLURAL OUTLETS

[76] Inventors: C. Albert Gregory; Willis H. Gregory, both of Rte. 2, Angier, N.C. 27501

[21] Appl. No.: 915,968

[22] Filed: Jun. 15, 1978

[51] Int. Cl.$^2$ .......................... A01C 7/18; A01C 15/00
[52] U.S. Cl. ..................................... 222/625; 222/485
[58] Field of Search ............... 222/267, 274, 614, 623, 222/624, 557, 625, 485

[56] References Cited

U.S. PATENT DOCUMENTS

| | | | |
|---|---|---|---|
| 349,527 | 9/1886 | Shank et al. | 222/485 X |
| 361,403 | 4/1887 | Follmer | 222/625 |
| 2,609,127 | 9/1952 | Wood | 222/274 |
| 2,632,651 | 3/1953 | Rittenhouse | 222/485 X |
| 3,127,069 | 3/1964 | Tygart | 222/625 X |

*Primary Examiner*—David A. Scherbel

*Attorney, Agent, or Firm*—Mills & Coates

[57] ABSTRACT

The present invention relates to an improved agricultural distributor including a hopper having a side wall structure and bottom and a plurality of spaced apart openings provided therein for dispensing material from said hopper. A cam type rotary flow control plate is rotatively secured to the bottom of said hopper adjacent said openings for simultaneously controlling the flow rate of material from said hopper by controlling the effective opening area of respective openings. Provided within said hopper is a plurality of spaced apart gear wheels that are rotatively driven during the operation of the distributor such that the gear wheels generally agitate the material within the hopper and also serve to generally deliver and meter material to and through said openings.

4 Claims, 5 Drawing Figures

ND TITLE AGRICULTURAL DISTRIBUTOR HAVING A CONTROL VALVE FOR PLURAL OUTLETS

The present invention relates to a distributing apparatus, and more particularly to an apparatus commonly referred to as a general purpose agricultural distributor for distributing material such as fertilizer, pesticides and herbicides.

BACKGROUND OF INVENTION

Today, the conventional fertilizer distributor is being used in other agricultural applications such as dispensing and distributing herbicides and pesticides as well as being used for applying granular nitrogen and top dressings and the like. In these extended uses, that is uses such as applying herbicides and pesticides, it becomes very important to be able to control with more precision the amount of material being distributed to the soil. If this is not done, and an over-application is made, then this can result in harm and damage to both the soil and the crop.

Often it is found that conventional fertilizer distributors do not have the precision to accurately control the flow rate of material needed for applications of pesticides and herbicides, especially in the lower range where application rates can vary from zero to twenty pounds of material per acre. One principal reason for this is that the particles of certain materials are very tiny and minute in comparison to fertilizer, and conventional fertilizer distributors are not designed to handle such small particles. Therefore, there is a real need for a multipurpose agricultural distributor that includes a precision flow control mechanism, but which is not so expensive as to prohibit the purchase of such by farmers.

SUMMARY OF INVENTION

The present invention relates to a multipurpose agricultural distributor and is particularly designed to efficiently and effectively distribute various materials such as fertilizer, pesticides, and herbicides. A cam type flow control device is incorporated into the distributor and allows for precision control of the flow rate of material from the hopper and is particularly designed to allow for the flow rate control of certain materials to a level as low as four to five pounds per acre. Moreover, the flow control device of the present invention is particularly designed to handle and control the flow rate of materials wherein the particle size of the particular material is very tiny and minute compared to the particle sizes of certain materials such as conventional fertilizer or soda.

In addition to the cam type flow control device of the present invention, the fertilizer distributor is provided with a rotating gear wheel mechanism disposed above the bottom of the fertilizer hopper where material exits therefrom. Besides generally imparting an agitating action to material thereabout, the gear wheel mechanism tends to deliver and meter material within the hopper to and through openings disposed within the bottom of the hopper so as to give rise to a generally positive distribution and flow control system.

It is, therefore, an object of the present invention to provide a multipurpose distributor adapted to distribute material such as fertilizer, pesticides, and herbicides, wherein the distributor is provided with a flow control device for varying and controlling the rate of application and which is highly precise so as to allow for precision control of flow rate at relatively low application rates.

Another object of the present invention is to provide an agricultural distributor that is capable of accurately distributing herbicides and the like at rate levels as low as four to five pounds per acre.

Another object of the present invention is to provide a material distributor for distributing granular material wherein a driven rotary gear wheel mechanism is provided internally within the hopper of the distributor that serves to both agitate and meter exiting material.

More particularly, it is an object of the present invention to provide a material distributor having a gear wheel mechanism incorporated therein wherein respective gear wheels include side enclosures such that respective gear wheels are only open about the circumferential portions thereof.

Still a further object of the present invention resides in the provision of a flow control system for a material distributing apparatus of the type adapted to distribute granular material such as fertilizer, pesticides, and herbicides wherein the flow control system comprises opening means in the bottom of the distributor hopper and controlled by an adjacently mounted rotary cam plate, and wherein delivery and metering to and through said openings is achieved by a rotary driven gear mechanism disposed above said opening means.

Another object of the present invention is to provide a material distributor of the type described above that has the capability of positively meter and distribute two separate and independent flows from the hopper of the distributor such that each of the flows is substantially equal.

Finally it is an object of the present invention to provide a material distributor with a cam type rotary flow control device that will simultaneously control the effective opening area of each of plurality of separate and independent openings within a hopper such that for any given setting of said flow control device each opening has substantially equal areas of effective opening.

Other objects and advantages of the present invention will become apparent from a study of the following description and the accompanying drawings which are merely illustrative of the present invention.

DESCRIPTION OF PREFERRED EMBODIMENT

Figures 1, 2:
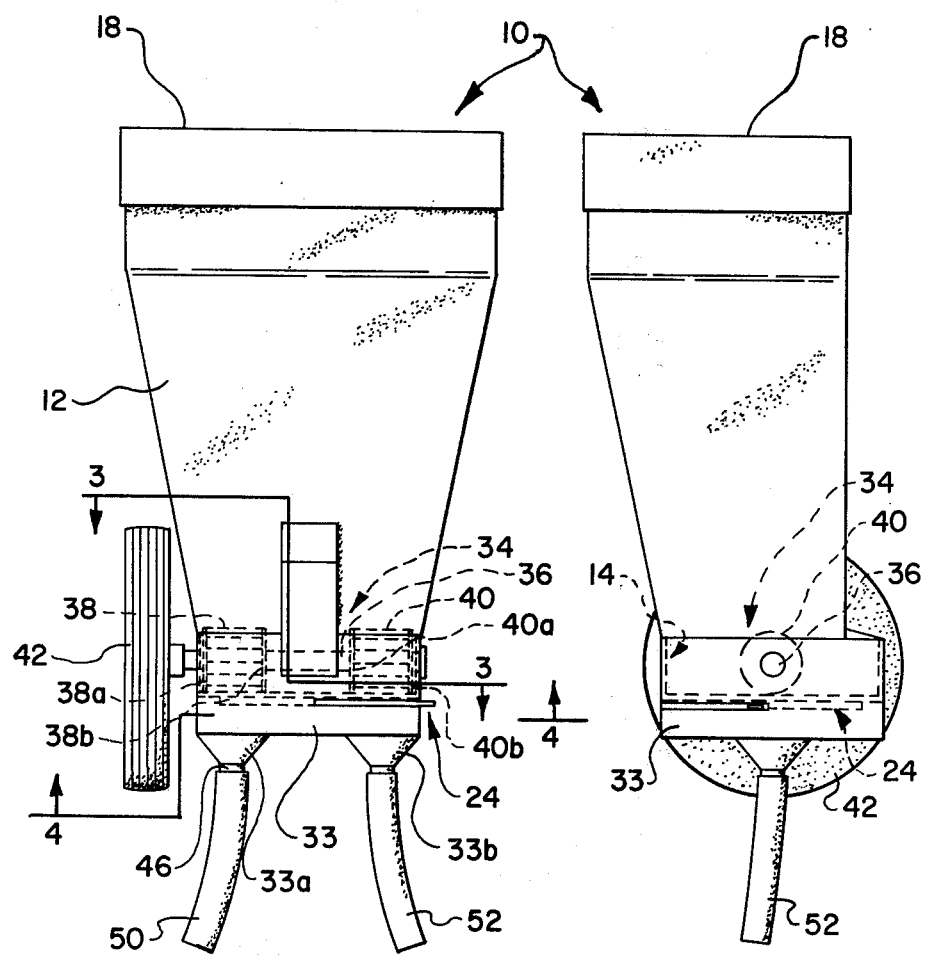
FIG. 1 is a side elevational view of the material distributor of the present invention.
FIG. 2 is also a side elevational view of the material distributor rotated ninety degrees from the position shown in FIG. 1.

With further reference to the drawings, the material distributor of the present invention is shown therein and is indicated generally by the numeral 10. Distributor 10 includes a side wall structure 12, preferably constructed of fiberglass, and a lower base portion 14 secured interiorly of wall 12. The wall 12 and base portion 14 define a hopper that is designed to contain material such as fertilizer, pesticides and herbicides therein.

The base 14 is communicatively connected to the wall 12 by volts or other suitable means and includes an outer circular band 15 and a bottom 16.

To enclose the hopper, a top 18 is provided and is adapted to fit around the top of the wall structure 12.

Formed in bottom 16 is a pair of elongated spaced apart openings 20 and 22. Associated with openings 20 and 22 is a flow regulating and controlling device, indicated generally by the numeral 24 (FIG. 4), which is of the rotary cam type. Viewing the flow regulating and controlling device 24 in more detail, it is seen that the same includes a rotary plate 26 pivotably mounted to bottom 16 by a pivot pin or bolt assembly 30. Secured about the lower side of plate 26 is a holding bar 28 that is held tightly adjacent the plate by the pivot pin 30 and which assures that plate 26 is held tightly adjacent bottom 16. Extending from the rotary plate 26 is a handle 32 which allows the plate 26 to be rotated by hand about the axis of pivot pin 30.

Viewing rotary plate 26 in more detail, it is seen that the same is made up of two reversed symmetrical areas 26a and 26b. Spaced about each area 26a and 26b are a pair of curved edges 26c and 26d which are symmetrical but which are reversed and disposed opposite each other.

Figures 3, 4:
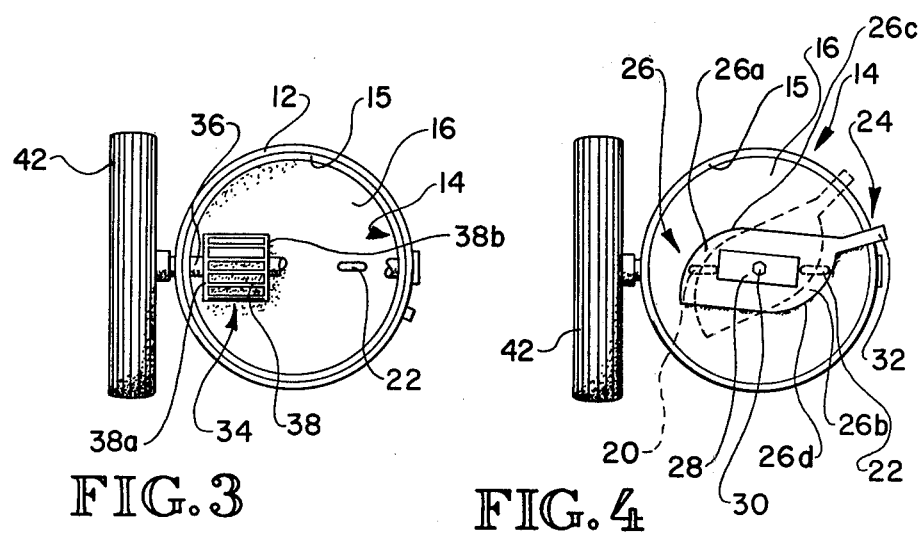
FIG. 3 is a sectional view taken along the lines 3—3 of FIG. 1.
FIG. 4 is a sectional view taken along the lines 4—4 of FIG. 1.
Figure 5:
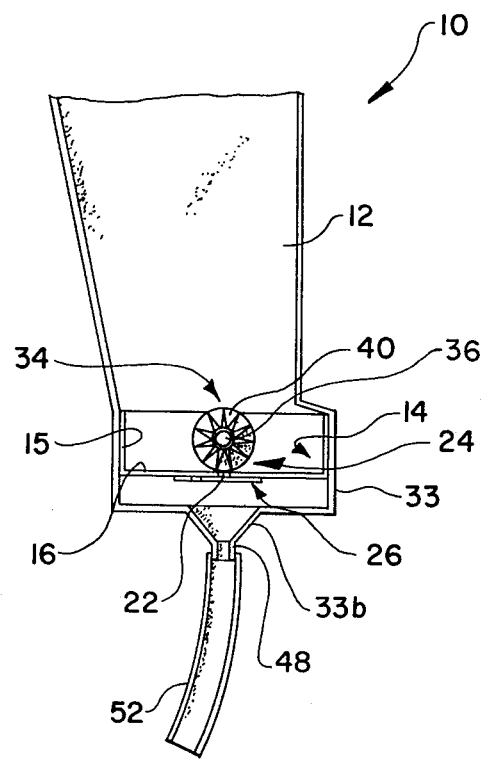
FIG. 5 is a fragmentary vertical sectional view of the material distributor of the present invention illustrating a portion of the internal structure thereof.

It is seen from FIG. 4 that plate 26 and the two areas thereof 26a and 26b are particularly shaped such that in a closed position (full lines FIG. 4) the plate 26 completely covers openings 20 and 22 so as to prevent the flow of material therethrough. It is also appreciated that as the plate 26 is rotated counterclockwise, as viewed in FIG. 4, that the respective edges 26c and 26d are so shaped with respect to openings 20 and 22 and the axis of rotation of the plate, that openings 20 and 22 are simultaneously opened equal amounts by edges 26c and 26d. It will, therefore, be appreciated that the rotary plate 26 of the flow regulating and control device 24 functions to simultaneously control and regulate the flow rate of material from both spaced apart openings 20 and 22 so as to give rise to a dual flow control system where each respective flow from each respective opening 20 and 22 results in an equal flow rate for any particular given setting of the rotary plate 26.

Continuing to refer to the material distributor 10, it is seen that inside of the hopper of the distributor there is provided a driven rotary mechanism indicated generally by the numeral 34. Viewing the rotary mechanism in more detail, it is seen that the same comprises a drive shaft 36 transversely journaled across the hopper above bottom 16 and closely adjacent thereto. Secured to drive shaft 36 in axial spaced apart relationship is a pair of rotary gear wheels 38 and 40. Each gear wheel 38 and 40 is preferably constructed of a relatively hard rubber material and includes a plurality of spur type gears circumferentially disposed about drive shaft 36. Side enclosures 38a and 38b are provided on each side of gear wheel 38 while like side enclosures 40a and 40b are provided about the sides of gear wheel 40. This tends to close the gear wheels such that they are only open about the circumferential area thereof.

From the drawings, it is appreciated that the drive shaft 36 and the gear wheels 38 and 40 secured thereto are disposed closely adjacent bottom 16 with the respective gear wheels being generally centered over respective openings 20 and 22 and disposed in generally tangential relationship with respect thereto. Consequently, it is appreciated that each gear wheel 38 and 40 serves as an agitator and also because of the particular design and relationship of the gear wheels 38 and 40 to the openings 20 and 22, the gear wheels also serve as a control valve. This means that when the distributor 10 is stationary in the field but yet the openings 20 and 22 are at least partially open because of the position of plate 26, that the respective gear wheels 38 and 40 still tend to prohibit flow through the openings 20 and 22.

Moreover, it is appreciated that the gear wheels tend to deliver material within the distributor 10 to an area adjacent openings 20 and 22 in order that the material may be dispensed through the respective openings. Consequently, then it may be said that the gear wheels tend to meter the flow of material to the openings 20 and 22.

Because drive shaft 36 is driven, it follows that the material distributor 10 of the present invention must be provided with some means to drive the same. Although a drive sprocket can be provided about the shaft exterior of the hopper and driven through a chain or the like, the material distributor of the present invention, as shown in the drawings, is of the type adapted to mount directly to an implement such as a transplanter and is provided with a drivewheel 42 secured to the drive shaft 36 which is adapted for properly mounting to an implement to engage a drive wheel such as a planter wheel with a transplanter, such that torque from the drive wheel is transferred through the frictional drive wheel 42 to the drive shaft 36. For a more detail understanding of this type of drive system, one is referred to the disclosure found in U.S. Pat. No. 4,080,911 which is expressly hereby incorporated by reference. Although this disclosure incorporated does relate to a frictional drive arrangement for driving drive shaft 36, it is appreciated by those skilled in the art that other suitable drives may be employed such as chain or belt drives.

Secured adjacent bottom 16 and consequently forming a part of the distributor 10 is a bottom cover enclosure 33 that includes a pair of spaced apart funnel shaped depressions 33a and 33b. The funnel shaped depressions 33a and 33b are generally aligned with openings 20 and 22 for receiving material being dispensed therethrough. Each funnel shaped depression 33a and 33b includes an outer lip 46 and 48 which is adapted to frictionally receive flexible spouts 50 and 52 for directing material to a desired area of the ground or soil during the distributing operation.

Adjacent an outer edge of the bottom enclosure 33 along the stroke of the handle 32 for rotating plate 26, there is provided a calibrating scale (not shown) that indicates the particular flow rate that would be achieved by particular settings of the plate 26. If the size of material significantly affects flow rate, the calibrated scale could provide a series of scales for particular materials and/or particular size materials to be distributed.

Of particular importance in the present invention, is the fact that the flow regulating and controlling device 24 as particularly shown in the present application is designed for high precision control. This means that where the material is in relatively small particles such as herbicides, the control device disclosed herein is capable of controlling the flow rate of the material to as low as four to five pounds per acre. In the case of nitrogen soda where the material size is larger, the material distributor 10 of the present invention is capable of controlling the application rate of that material to a level as low as twenty pounds per acre. This is a substantial improvement over conventional prior art device and is very important to the farmer.

From the foregoing specification, it is seen that the material distributor 10 of the present invention is relatively simple and inexpensive, but yet has the ability to maintain high precision control over the application rates of material being distributed thereby. In addition, the material distributor 10 is sturdy in construction and is reliable, and is easy to maintain.

The terms "upper", "lower", "forward", "rearward", etc., have been used herein merely for the convenience of the foregoing specification and in the appended claims to describe the improved agricultural distributor and its parts as oriented in the drawings. It is to be understood, however, that these terms are in no way limiting to the invention since the improved agricultural distributor may obviously be disposed in many different positions when in actual use.

The present invention, of course, may be carried out in other specific ways than those herein set forth without departing from the spirit and essential characteristics of the invention. The present embodiments are, therefore, to be considered in all respects as illustrative and all changes coming within the meaning and equivalency range of the appended claims are intended to be embraced therein.

What is claimed is:

1. A multipurpose agricultural distributor for dispensing fertilizer, pesticides, herbicides and the like comprising: a hopper having a bottom and a side wall structure for holding material therein to be distributed; rotary means disposed interiorly of said hopper for engaging material within said hopper when driven; drive means for driving said rotary means wherein material within said hopper is generally agitated by said rotary means; said bottom of said hopper including at least two like and separate spaced apart openings, spaced approximately 180° apart, for allowing material to flow from said hopper; said rotary means including a drive shaft rotatively driven within said hopper above said openings, and wherein there is provided a plurality of spaced apart gear wheels fixed to said drive shaft and rotatable therewith with respective gear wheels being disposed above respective openings within the bottom of said hopper, whereby said gear wheels generally agitate the material within said hopper and also tend to meter the flow of material and through said openings during the distributing operation, and wherein said gear wheels thereof is responsive to the movement of said distributor such that the gear wheels are only driven when the distributor is being moved along a distributing path, and wherein said gear wheels are spaced relatively close to respective openings within the bottom of said hopper such that when the distributor is at a standstill and said openings are opened, said gear wheels act as a valve and generally tends to block and prohibit the flow of material through said openings; a rotary cam type flow regulating and controlling device rotatively mounted about a pivot point disposed between and adjacent said openings for controlling the rate of flow of material being dispersed through said openings, said rotary cam type flow controlling device including a rotatively mounted plate and a lever extending outwardly therefrom; said plate having two opposed curved edges about the outer periphery thereof with each curved edge being selectively curved and shaped relative to the position of said openings and said pivot point such that as said plate is rotated said opposed outer curved edges of said plate traverse across said respective openings in a manner that effectively opens and/or closes each of said openings a like amount as the plate itself actually serves to close said openings while the selective shape of each opposed curved edge allows each opening to have an equal effective opening size irrespective of the radial position of said plate, whereby the rotation of said plate results in the simultaneous opening and closing of said openings equally such that for any given setting of said plate said respective openings are opened or closed essentially the same such that the rate of flow from each opening is generally always substantially equal to the rate of flow from the other opening.

2. The agricultural distributor of claim 1 wherein said gear wheels are constructed of a rubber type material and are provided with closing sides on each side thereof so as to more effectively meter material to and through said openings.

3. The agricultural distributor of claim 2 wherein said gear wheels are centered above respective openings and spaced relative to said openings such that the lower periphery of respective gear wheels lie closely adjacent said openings in generally tangential relationship relative thereto.

4. The agricultural distributor of claim 3 wherein there is provided a bottom cover enclosure secured adjacent said bottom and having a plurality of funnel shaped depressions with exiting openings formed therein which are aligned with respective openings in said bottom, whereby material dispensed from said openings are directed to said funnel shaped depressions and through said exiting openings thereof.

* * * * *